(12) United States Patent
Palin et al.

(10) Patent No.: US 8,391,789 B2
(45) Date of Patent: Mar. 5, 2013

(54) APPARATUS FOR FACILITATING PERIPHERAL DEVICE SELECTION

(75) Inventors: Arto Palin, Viiala (FI); Jukka Reunamäki, Tampere (FI)

(73) Assignee: Nokia Corporation, Espoo (FI)

( * ) Notice: Subject to any disclaimer, the term of this patent is extended or adjusted under 35 U.S.C. 154(b) by 82 days.

(21) Appl. No.: 12/763,106

(22) Filed: Apr. 19, 2010

(65) Prior Publication Data
US 2011/0256895 A1 Oct. 20, 2011

(51) Int. Cl.
H04B 7/00 (2006.01)
(52) U.S. Cl. ...... 455/41.2; 455/509; 455/41.1; 455/41.3
(58) Field of Classification Search .................. 455/509, 455/41.1–41.3
See application file for complete search history.

(56) References Cited

U.S. PATENT DOCUMENTS

| | | | |
|---|---|---|---|
| 7,389,041 B2 | 6/2008 | Gindele et al. | |
| 2004/0010608 A1 * | 1/2004 | Piccionelli et al. | 709/229 |
| 2006/0252530 A1 * | 11/2006 | Oberberger et al. | 463/29 |
| 2007/0162942 A1 | 7/2007 | Hamynen et al. | |
| 2010/0211698 A1 * | 8/2010 | Krishnaswamy | 710/11 |
| 2010/0273505 A1 | 10/2010 | Moller et al. | |

FOREIGN PATENT DOCUMENTS

| | | |
|---|---|---|
| EP | 0 867 690 A1 | 9/1996 |
| EP | 1 377 055 A1 | 1/2004 |
| WO | WO 2008/118119 A1 | 10/2008 |

OTHER PUBLICATIONS

International Search Report and Written Opinion for Application No. PCT/FI2011/050237 dated Jul. 12, 2011.
http://electronics.howstuffworks.com/autofocus7.htm, Feb. 6, 2010.
http://en.wikipedia.org/wiki/Autofocus, Feb. 6, 2010.
http://www.electricpig.co.uk/2009/01/09/nokia-locate-sensor-never-lose-anything-again, Feb. 6, 2010.

* cited by examiner

Primary Examiner — Fayyaz Alam
(74) Attorney, Agent, or Firm — Alston & Bird LLP

(57) ABSTRACT

Apparatus for enabling the connection of an electronic device to a particular peripheral device, wherein the apparatus is configured to
- determine a first measure of the geographical location of the particular peripheral device using geographical location signalling;
- associate the determined first measure of the geographical location of the particular peripheral device with a communication channel signalling used by the particular peripheral device;
- discriminate the communication channel signalling for the particular peripheral device based on the association; and
- enable selection of the geographical location of the particular peripheral device to use the communication channel signalling to provide for connection of the electronic device to the particular peripheral device to allow the electronic device to use the functionality provided by the particular peripheral device.

20 Claims, 5 Drawing Sheets

Figure 3
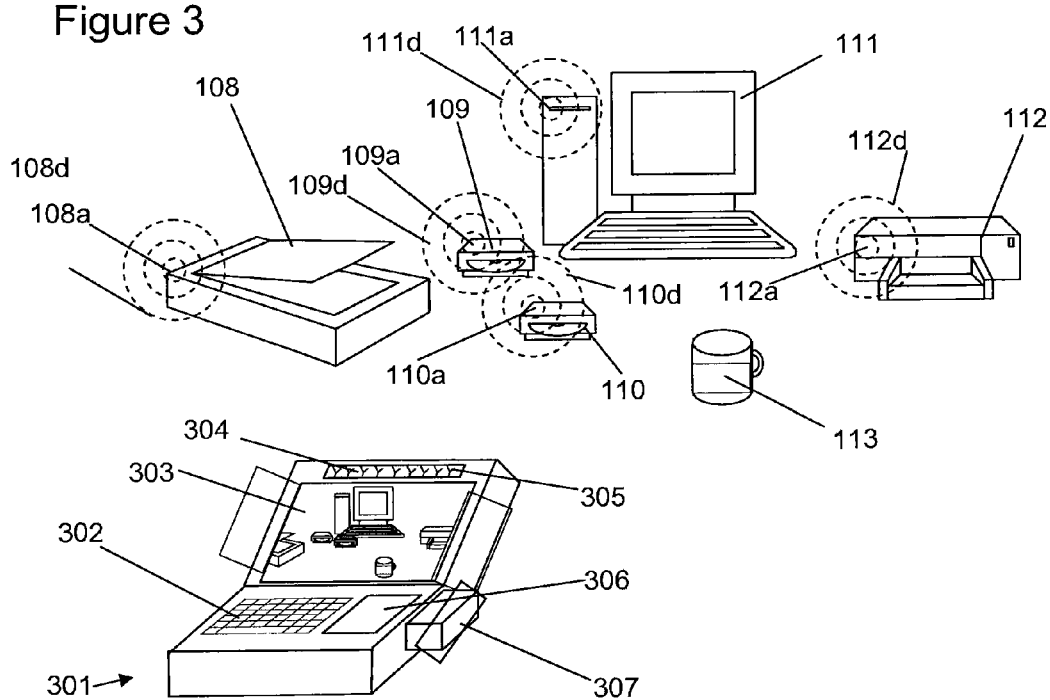
Figure 4a
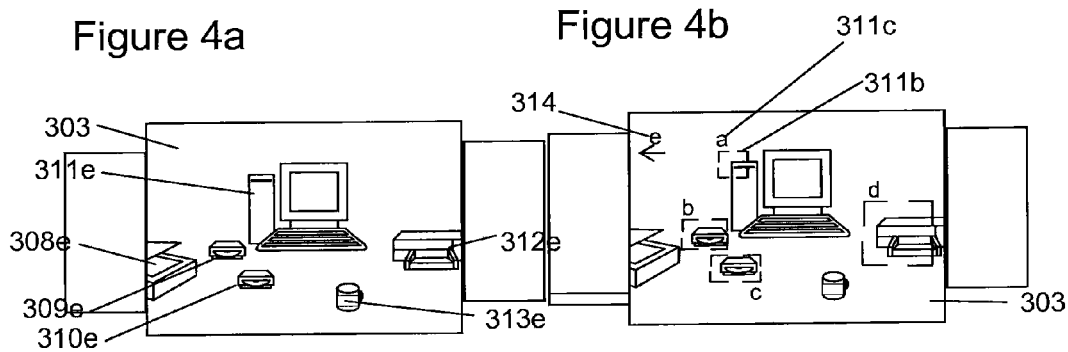
Figure 4b
Figure 4c
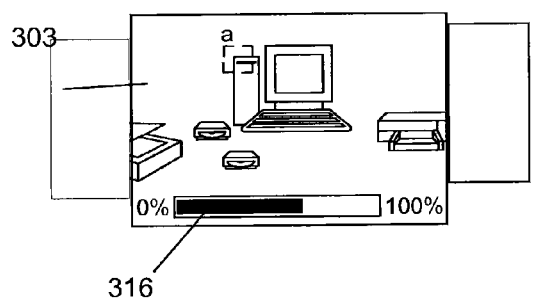

APPARATUS FOR FACILITATING PERIPHERAL DEVICE SELECTION

TECHNICAL FIELD

The present disclosure relates to the field of selecting a particular peripheral device, associated methods, computer programs and apparatus. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

Making secure and painless connections is not easy with ad hoc peripheral devices or other wireless technologies due to the number and range of technologies and peripheral devices available. Selecting and connecting to a particular peripheral device to use the functionality of that peripheral device is complicated by the fact that the user may not have detailed knowledge of the communication channels used by the particular peripheral device. The connection setup has become more and more complex as more peripheral devices support wireless connectivity. The invention may overcome some of these issues by enabling the selection of the correct and/or desired particular peripheral device using determinations/measurements/calculations of geographical location.

Advantages of an apparatus with this capability may include that the communication channel signalling of the peripheral devices can be varied to suit to the prevailing conditions. For example the communication channel signalling frequency of the peripheral device may be changeable to avoid conflict or cross-talk with other devices in the vicinity. Given this flexibility, the user may not know at any particular time which communication channel signalling is being used. Associating the communication channel signalling with a first measure of geographical location allows the user to select the desired device on the basis of something that he/she is likely to know (the geographical location of the particular peripheral device), but connect using information which he/she may not have access to (the nature of the communication channel signalling at that time). In other words, by associating the communications channel signalling with a measure of geographical location, the user can use the selection of the measure of geographical location as a proxy for the selection the corresponding communications channel signalling.

SUMMARY

In a first aspect, there is provided apparatus, wherein the apparatus is configured to:
  determine a first measure of the geographical location of a particular peripheral device using geographical location signalling;
  associate the determined first measure of the geographical location of the particular peripheral device with a communication channel signalling used by the particular peripheral device;
  discriminate the communication channel signalling for the particular peripheral device based on the association; and
  enable selection of the geographical location of the particular peripheral device to use the communication channel signalling to provide for connection of an electronic device to the particular peripheral device to allow the electronic device to use the functionality provided by the particular peripheral device.

Peripheral devices may include equipment which can interact with the apparatus and provide additional functionality to the electronic device. Examples of peripheral devices may include printers, scanners, tape drives, disc drives, microphones, speakers, computers, laptops, webcams, keyboards, mice, monitors and cameras. Examples of functionality may include providing additional user interfaces, data storage, data transfer, printing and communication.

The electronic device may comprise one or more combinations of keyboards, switches, screens, buttons, scanners, cameras, ports or other systems with which a user interacts with the electronic device (i.e. user interface elements). The electronic device may or may not comprise the apparatus. The apparatus may be housed in a separate second device in data communication with the electronic device. The second device may comprise one or more combinations of keyboards, switches, screens, buttons, scanners, cameras, ports or other user interface elements. The apparatus may be housed in a single device or in a plurality of devices in data communication with each other.

The geographical location signalling may be wireless signalling. Examples of wireless geographical location signalling may include ultrasound, infrared, visible light and radio waves. The geographical location signalling may be wired signalling. Geographical location signalling may originate from the apparatus (e.g. ultrasound), the peripheral device (e.g. RFID tag embedded in the peripheral device), a separate device (e.g. light bulb), or elsewhere (e.g. ambient light from the sun).

Communication channel signalling may comprise signalling relating to the establishment of a wireless connection, signalling relating to the transfer of data between the peripheral device and an electronic device (which may be the electronic device which is to be connected to another connected/connectible electronic device in the vicinity), signalling denoting the type of device, signalling denoting the geographical location of the peripheral device and/or signalling denoting the status of the peripheral device.

The measure of the geographical location provides an indication of the relative position of the particular peripheral device with respect to the apparatus.

The measure of the geographical location may include either a measure of the distance between the apparatus and the particular peripheral device, the orientation of the particular peripheral device relative to the apparatus or both. A measure of the orientation of the particular peripheral device relative to the apparatus may comprise a measure of the angle between a first axis defined in terms of the apparatus and a second axis which intersects both the apparatus and the particular peripheral device. The geographical location may also be determined for the apparatus and/or the particular peripheral device relative to a third object (for example, using a global navigation satellite system such as GPS).

Determining a measure of the distance between the apparatus and an object can be performed in a number of ways. As measuring the geographical position of the particular peripheral device may be performed on objects which are not necessarily peripheral devices, some of the techniques will be described in terms of measuring the distance between an object and the apparatus, it will therefore be appreciated that the term "object" may encompass peripheral devices and the particular peripheral device.

Examples of measures of geographical location using wired geographical location signalling may include calculating the length of wire between an object and the apparatus by measuring the ping time. The ping time is the time taken for a piece of information to be transmitted by the apparatus to the object and returned, the piece of information being the geographical location signalling in this case. The wire length may be calculated using the measured ping time and the speed of the wired geographical location signalling. Wired signalling may be considered to include signalling which is constrained to follow a path by at least one constraining member between the transmitter and receiver and may encompass signalling transmitted via fibre-optic cables.

Wireless distance measuring techniques include the use of manual focus, passive autofocus and active autofocus. The resulting measure of distance may be considered to be a measure of geographical location.

Passive autofocus does not require signalling to be produced by the apparatus and uses signalling emanating from the object to determine the distance between the object and the apparatus performing the autofocus. Emanating signalling may encompass signalling emitted by the object, signalling reflected by the object and signalling scattered by the object. Examples of passive autofocus techniques include contrast detection and phase detection.

Active autofocus, as opposed to passive autofocus, may involve the use of signalling produced by the apparatus which is then scattered or reflected by the target object. Examples of active autofocus techniques include measuring the time for signalling to travel from the apparatus to the object and return to the apparatus (time of flight measurement). Active autofocus techniques may encompass illuminating the object with a distinctive illumination pattern and using contrast detection to calculate the distance.

Determining the orientation of an object relative to the apparatus may also be performed in a number of ways. A measure of the orientation may be determined by whether or not the object is in the apparatus' field of view. In this case an error on the orientation measurement can be calculated from a measure of the apparatus' field of view. A narrower field of view corresponds to a more accurate measure of the orientation of the object relative to the object. In the case where a number of peripheral devices are present, the particular peripheral device may be selected by restricting the field of view until only the particular peripheral device is within the apparatus' field of view, for example, by zooming in on the object or if imaging using a lens having an adjustable aperture between the lens and image plane.

A measure of the orientation may also be determined by imaging a scene (comprising the object) onto an image plane. The orientation of the object can be calculated from the position of the object image on the image plane and knowledge of the configuration of the imaging optics. In the case where a number of peripheral devices are present, the particular peripheral device can be selected by selecting the region of the image plane or scene image containing only the particular peripheral device. This selection may be facilitated via a graphical user interface such as a display or a screen. The graphical user interface may display the data received at the image plane or provide a representation of the data received at the image plane. Alternatively the user may view the image directly, such as through a view finder or telescope or binoculars, and select a particular peripheral device by orientating the apparatus.

The apparatus may incorporate a pointer which indicates an orientation or a range of orientations and wherein the pointer can be moved relative to an object. The indicated orientation, for example, may be specified, for example, by the physical shape of the pointer or by a directional beam emitted by the pointer. The pointer can be used to select/discriminate the particular peripheral device by distinguishing peripheral devices which are being pointed at.

The apparatus may be configured to provide a request based upon which communication channel signalling is transmitted by the particular peripheral device. Alternatively the apparatus may be configured to interact with at least one peripheral device which autonomously transmits communication channel signalling.

In order to associate the determined first measure of geographical location with the communication channel signalling used by the particular peripheral device, the apparatus may distinguish which communication channel signalling is produced at which location. Distinguishing which communication channel signalling is produced at which location may be implemented by measuring the geographical location of the particular peripheral device using the communication channel signalling, or by processing information transmitted by the communication channel signalling relating to the geographical location of the particular peripheral device.

Communication channel signalling may wireless signalling such as electromagnetic radiation, Wi-Fi, Bluetooth™, IR, GSM, TDMA, WCDMA, 3G or variations thereof. Alternatively, communication channel signalling may be wired signalling. Each peripheral device may have characteristic communication channel signalling, or multiple devices may have the same communication channel signalling wherein the apparatus can discriminate between devices based on their geographical location. Characteristic communication channel signalling is communication channel signalling wherein the signalling is distinct for each peripheral device. In other embodiments characteristic communication channel signalling from different peripheral devices may be distinguished, for example, by frequency, by modulation, or by having a distinct data trace.

A measure of distance, which is a measure of geographical location, may be determined using the received signal strength. This may be an absolute measure of distance or a relative measure of distance between a number of peripheral devices. Examples include the use of a received signal strength indicator (RSSI) and/or a received channel power indicator (RCPI). Alternatively/additionally, a measure of distance may be determined using a plurality of steerable antenna spaced away from each other. By measuring the angle of incidence of the communication channel signalling at multiple steerable antenna the distance can be calculated by triangulation. A similar process may be performed by a single steerable antenna with at least three constituent antenna, or spatially configurable constituent antenna/antennae.

A measure of orientation, which is also a measure of geographical location, may be determined using an antenna which has a scannable preferred reception orientation (for example, a steerable antenna). The orientation of the object emitting the communication channel signalling may be determined by scanning the preferred orientation and determining the orientation by measuring in which configuration the received communication channel signalling is strongest. Alternatively/additionally, an array of antennae may be provided to measure the phase of the received communication channel signalling. By measuring the phase difference between different constituent arrayed antennae the angle of incidence may be calculated.

It will be appreciated that measurements of the geographical locations of the peripheral device relative to the apparatus may be made by the apparatus, the peripheral device or a third device. A measure of the geographical location may be transmitted to the apparatus using communication channel signalling.

The association of a determined first measure of geographical location determined using geographical location signalling with the communication channel signalling can be implemented by the use of a comparison between the determined first measure and a determined second measure of geographical location wherein the determined second measure of geographical location is determined using communication channel signalling. It will be appreciated that this comparison can be considered as a cross-correlation of two measures of geographical location, one measure determined using geographical location signalling, the other measure determined using communication channel signalling.

Discrimination of a signalling may enable the apparatus to distinguish/recognise at least one signalling and interact with it selectively/preferentially over other signalling. Discrimination of the communication channel signalling for the particular peripheral device can be performed in a number of ways. If the apparatus/electronic device has a communication channel signalling receiver with a limited field of view, only peripheral devices within that field of view may be able to connect with the apparatus/electronic device. This discriminates signalling emanating from within the field of view from signalling emanating from outside the field of view. For example, to communication channel signalling receivers with a fixed field of view, the particular peripheral device may be selected and discriminated by orientating the portable electronic device such that only the particular peripheral device is within the apparatus' communication channel signalling receiver's field of view. Communication channel signalling receivers, such as steerable antennae, which in one mode scan a wide field of view, can also be configured to only receive signalling from a particular orientation. By configuring the communication channel signalling receiver to receive signalling only from the orientation corresponding to the particular peripheral device, the particular peripheral device may be selected and discriminated.

Discrimination may also be related to the type/nature of the communication channel signalling. If each peripheral device transmits communication channel signalling characteristic to the peripheral device, the apparatus may select which peripheral device to connect to the electronic device based on geographical location, but discriminate the particular peripheral device on the basis of characteristic communication channel signalling. For example the discrimination may be implemented by tuning the apparatus to receive only electromagnetic waves of a certain frequency range.

It will be appreciated that the selection/discrimination may select/discriminate a subset of peripheral devices over other peripheral devices, wherein the subset of peripheral devices comprises a plurality of peripheral devices. It will be appreciated that a particular peripheral device may comprise a plurality of peripheral devices.

It will be appreciated that functions of the apparatus, for example, restricting the field of view, may be carried out mechanically, by changing the physical/electronic configuration of the signal receiving apparatus or by post-processing the received data in such a way as to perform an equivalent function.

Advantages of the apparatus may include that selecting the particular peripheral device is easy and intuitive. Additionally it can provide a robust data link between the electronic device and the particular peripheral device. The apparatus also may permit the user to connect to devices without having detailed knowledge of the particular peripheral device's communication channel signalling.

In a second aspect, there is provided a method, the method comprising:
  determining a first measure of the geographical location of the particular peripheral device using geographical location signalling;
  associating the determined first measure of the geographical location of the particular peripheral device with a communication channel signalling used by the particular peripheral device;
  discriminating the communication channel signalling for the particular peripheral device based on the association; and
  enabling selection of the geographical location of the particular peripheral device to use the communication channel signalling to provide for connection of an electronic device to the particular peripheral device to allow the portable electronic device to use the functionality provided by the particular peripheral device.

In a third aspect, there is provided a computer program, the computer program comprising code configured to:
  determine a first measure of the geographical location of a particular peripheral device using geographical location signalling;
  associate the determined first measure of the geographical location of the particular peripheral device with a communication channel signalling used by the particular peripheral device;
  discriminate the communication channel signalling for the particular peripheral device based on the association; and
  enable selection of the geographical location of the particular peripheral device to use the communication channel signalling to provide for connection of an electronic device to the particular peripheral device to allow the electronic device to use the functionality provided by the particular peripheral device.

In a fourth aspect, there is provided apparatus, wherein the apparatus comprises:
  a locator to determine a first measure of the geographical location of a particular peripheral device using geographical location signalling;
  an associator to associate the determined first measure of the geographical location of the particular peripheral device with a communication channel signalling used by the particular peripheral device;

a discriminator to discriminate the communication channel signalling for the particular peripheral device based on the association; and a selector to enable selection of the geographical location of the particular peripheral device to use the communication channel signalling to provide for connection of an electronic device to the particular peripheral device to allow the electronic device to use the functionality provided by the particular peripheral device.

In a fifth aspect, there is provided means, wherein the means comprises:

a means for locating to determine a first measure of the geographical location of a particular peripheral device using geographical location signalling;

a means for associating to associate the determined first measure of the geographical location of the particular peripheral device with a communication channel signalling used by the particular peripheral device;

a means for discriminating to discriminate the communication channel signalling for the particular peripheral device based on the association; and a means for selecting to enable selection of the geographical location of the particular peripheral device to use the communication channel signalling to provide for connection of an electronic device to the particular peripheral device to allow the electronic device to use the functionality provided by the particular peripheral device.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:—

FIG. 3 depicts a further embodiment, which is a portable electronic device, interacting with a scene comprising a plurality of objects, the plurality of objects comprising peripheral and non-peripheral devices.

FIGS. 4a, 4b and 4c illustrate the display of the embodiment of FIG. 1, at various points at which the user is interacting with the portable electronic device.

DESCRIPTION OF EXAMPLE ASPECTS/EMBODIMENTS

Figure 1:
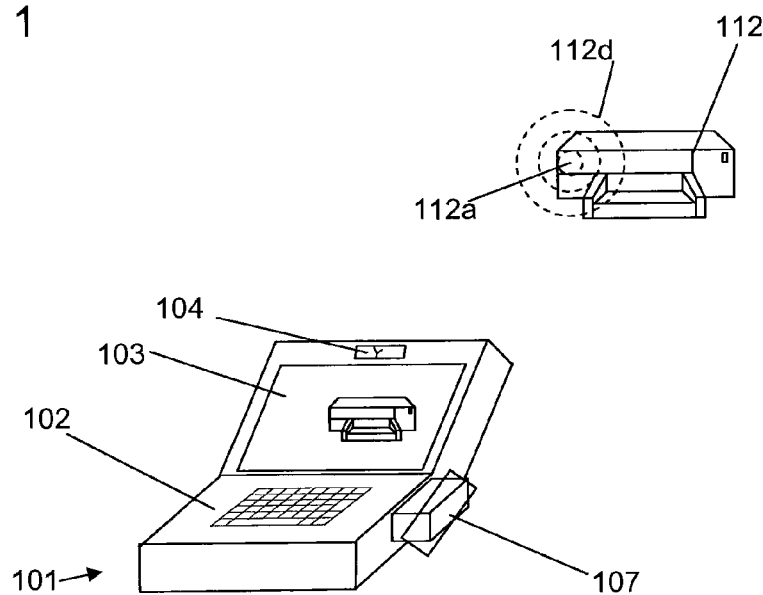
FIG. 1 depicts an embodiment, which is a portable electronic device, interacting with a scene comprising a single peripheral device.

For the sake of convenience, different embodiments depicted in the figures have been provided with reference numerals that correspond to similar features of earlier described embodiments. For example, feature number 1 can also correspond to numbers 101, 201, 301 etc. These numbered features may not have been directly referred to within the description of these particular embodiments. These have still been provided in the figures to aid understanding of the further embodiments, particularly in relation to the features of similar earlier described embodiments.

To connect an electronic device to a particular peripheral device, the electronic device may require detailed knowledge of the communication channel signalling used by the peripheral device. A casual user may not know, not remember or not have ready access to the required details of the communication channel signalling of the desired particular peripheral device, thereby preventing him/her from utilising the additional functionality provided by the particular peripheral device. The casual user will however often know and distinguish the desired peripheral device by appearance/function and/or geographical location. For example, he/she might want to use a printer that is in the corner of a room, or connect his/her computer to the peripheral device located in front of them.

As the geographical location of the desired peripheral device is often sufficient to distinguish it from other objects (including from other peripheral devices), knowledge of the geographical location may be used by the apparatus to obtain the required communication channel signalling details from the desired peripheral device to enable connection. One aspect disclosed herein relates to the association of a first measure of geographical location with the communication channel signalling of a particular peripheral device, to enable selection of the geographical location of the particular peripheral device to use its communication channel signalling. The communication channel signalling may then be used to provide for connection of an electronic device to the particular peripheral device to allow the electronic device to use the functionality provided by the particular peripheral device.

Embodiments described herein may use different signalling for different functions. For example, in the case of geographical location signalling, this may be signalling used primarily to determine a first measure of the geographical location, and therefore the type of geographical location signalling may be chosen/optimised to carry out this function. The type of geographical location signalling may also be chosen to enable the user to readily interact with it. For example, IR or visible light can be readily imaged on a CCD and an image displayed on a screen allowing easy user-interaction. In the case of communication channel signalling, this may be used primarily to transmit data between a peripheral device and the apparatus or between a peripheral device and an electronic device. Therefore communication channel signalling may benefit from good data carrying characteristics. For example, many peripheral devices use electromagnetic radiation in the radio frequency range (radio waves) to transmit data because of their data carrying capabilities.

By using geographical location signalling and communication channel signalling in conjunction (i.e. with a degree of association), the device comprising the apparatus may give a better user experience. The user may interact more readily and more intuitively with information derived from geographical location signalling, whilst the communication channel signalling may be optimised for data transfer (or the function which is to be performed).

FIG. 1 shows a portable electronic device (101) and a single peripheral device (112). The portable electronic device (101), for example a PDA, comprises the apparatus (not shown) and has a user interface comprising a keyboard (102), imaging optics (107) for imaging a scene, an antenna (104), and a display for displaying the image of the scene (103). It will be appreciated that the apparatus may comprise a processor contained within the portable electronic device. The imaging optics comprise a lens, an aperture and a CCD (charge coupled device) (not shown). A printer (112), having an antenna (112a) is within the locality. The printer and the portable electronic device each have global navigation satellite system receiver, such as a GPS receiver (not shown).

As mentioned above, in the locality of the portable electronic device there is a single particular peripheral device (a printer (112)). In order to connect to the particular peripheral device to facilitate the transfer of data and use of the functionality of the printer, the portable electronic device must be able to transmit and receive data to and from the printer using communication channel signalling. However, the user may not know the details of the communication channel signalling, used by the particular peripheral device, required to facilitate this.

Nevertheless, the user can simply point the portable electronic device (101) at the printer (112) such that the particular peripheral device is within the field of view of the optics (107) (and thus is shown on the display (104)). The user then initiates connection, e.g. by pressing a connect button (on the keyboard (102)). In this embodiment, the user is not required to do anything further to enable/initiate connection (although authentication may be required). For this embodiment the selection process may be faster and more intuitive to the user as he/she may have had experience of using digital cameras with similar imaging technologies.

Pressing the connect button prompts the portable electronic device to autofocus on the particular peripheral device (112) using phase detection autofocus and from the autofocus calculates the distance to the particular peripheral device (112). Autofocus relies on the use of the visible light spectrum. This process is, in effect, used to generate a first measure of the geographical location (which in this case is a measure of distance between the apparatus and the particular peripheral device as determined using the autofocus).

Pressing the connect button also results in the portable electronic device antenna (104) transmitting a request signal to all peripheral devices within the locality. The request signal prompts the peripheral devices to transmit communication signalling. Contained within the communication signalling is information of the geographical location of the peripheral device as determined by the global navigation satellite system. There are thus two independent sources of information of the geographical position/location of the peripheral device i.e. two measures of the geographical location of the peripheral device, one in relation to the electronic device (101), and the other, the absolute position (as provided by GPS).

By using the geographical location information contained within the communication channel signalling (112d), the first measure of the geographical location (as measured by autofocus i.e. using the visible spectrum) can be associated with the communication channel signalling (112d). These two independent sources of location information can be used to discriminate that the peripheral device which has been autofocussed is the same peripheral device which is transmitting communication channel signalling.

The apparatus is thus configured to discriminate the communication channel signalling transmitted by the particular peripheral device and connect to the particular peripheral device (112). In this case the signalling could be discriminated by only processing signalling which has the correct geographical location information embedded within the communication channel signalling and/or rely on specific addressed communication which can be subsequently established between the two devices (101)(102).

Once connected the user can then use the portable electronic device to transmit/receive information to/from the particular peripheral device.

Figure 2:
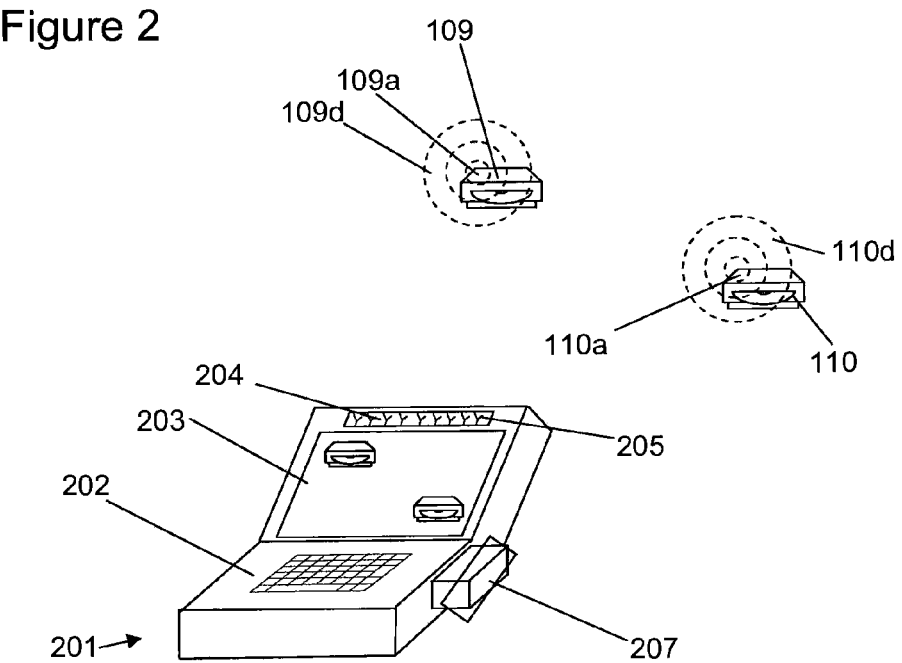
FIG. 2 depicts a further embodiment, which is a portable electronic device, interacting with a scene comprising a plurality of peripheral devices.

Whereas FIG. 1 shows an embodiment interacting with a single peripheral device, FIG. 2 depicts a different embodiment interacting with a plurality of peripheral devices. As there are multiple peripheral devices, to connect to a particular peripheral device the apparatus is configured to enable selection of the particular peripheral device and discriminate signalling coming from that particular peripheral device (as opposed to other unwanted peripheral devices).

FIG. 2 shows the embodiment which is a portable electronic device (201), for example a PDA, comprising the apparatus and having a user interface comprising a keyboard (202), imaging optics (207) for imaging a scene, a steerable antenna (204) having a number of constituent antenna (205), and a display for displaying the image of the scene (203) wherein the display is a touch-screen. Some objects, including a first disc drive (109) and a second disc drive (110), are within the field of view of the imaging optics of the portable electronic device. The imaging optics comprise a lens, an aperture and a CCD (charge coupled device) (not shown).

In this case the user wants to select the second disc drive (110) as the particular peripheral device. The user therefore orientates the portable electronic device to show the particular peripheral device (in this case the second disc drive (110)) on the display. The user may select the particular peripheral device by touching the image of the second disc drive shown on the display. In this case, this is all that is required of the user to select/initiate connection with the desired particular peripheral device (although subsequent authentication may be required).

Image processing of the selected region, such as contrast measurement autofocus (which uses the visible light spectrum), gives a first measure of distance to the selected peripheral device. In this case the geographical location signalling is the visible light scattered by the peripheral devices, and its measure provides the distance of the selected peripheral device to the portable electronic device/apparatus.

The scanning antenna (204) can then determine a second measure of the geographical location of the particular peripheral device, for example, by measuring the signal strength of the received communication channel signalling (109d, 110d). By comparing the first measure of geographical location with the second measure of geographical location (using knowledge of what the expected signal strength should be for a peripheral device at that distance), the communication channel of the particular peripheral device can be selected and discriminated.

When the communication channel of the particular peripheral device is discriminated the portable electronic device can connect to the particular peripheral device. Upon connection the second disc drive the user can enable data transfer between the disc drive and the portable electronic device (e.g. following authentication).

Whereas FIG. 1 and FIG. 2 show situations wherein an embodiment is interacting with at least one peripheral device FIG. 3 shows yet another embodiment interacting with a plurality of objects, some of which are peripheral devices and some of which are not peripheral devices.

FIG. 3 shows the embodiment which is a portable electronic device (301), such as a PDA, comprising the apparatus, having a user interface comprising a keyboard (302) and a touchpad (306), imaging optics (307) for imaging a scene, a steerable antenna (304) having a number of constituent antenna (305), and a display for displaying the image of the scene (303).

A number of objects forming a scene are at least partially within the field of view of the imaging optics of the portable electronic device. The imaging optics comprise a lens, an aperture and a CCD (charge coupled device) (not shown). The scene comprises a number of objects (108-113). Some objects are peripheral electronic devices including a computer (111) having a transmitting antenna (111a), a first disc drive (109) having a transmitting antenna (109a), a second disc drive (110) having a transmitting antenna (110a), a scanner (108) having a transmitting antenna (108a) and a printer (112) having a transmitting antenna (112a). Some objects, including a cup (113), are not peripheral devices. The peripheral device antenna (108a-112a) of each peripheral device emits communication channel signalling (108d-112d), upon request or at predetermined intervals.

The data in the displayed image captured by the CCD can be considered to be the first measure of the geographical location of the objects in the screen. This is because the orientation of the objects relative to the portable electronic device is visually indicated by their relative position on the screen (the position of an object's image on the screen (308e-312e) gives a visual indication of the relative orientation of that object (308-312) with respect to the portable electronic device). The geographical location signalling in this case can be considered to be visible light scattered from the scene.

FIG. 4a illustrates the graphical representation of scene depicted on the display (103) of the portable electronic device (101) shown in FIG. 1.

When communication channel signalling is received by the apparatus of the portable electronic device (101) from the peripheral devices (108-112), the portable electronic device determines a second measure of the geographical location of each object emanating communication channel signalling. This is because the steerable antenna (304) of the portable electronic device (301) is made up of a number of constituent antennae (305). Communication channel signalling will strike each constituent antenna at different times as a function of the speed of the communication channel signalling, of the spatial configuration of the constituent antennae and of the orientation of the communication channel transmitter with respect to the steerable antenna. As the speed of the communication channel signalling and the spatial configuration of the constituent antennae are known, by measuring the times at which the constituent antenna receive the communication channel signalling, the orientation of the communication channel transmitter with respect to the steerable antenna can be calculated, and thus the second measure of the geographical location can be obtained.

As the steerable antenna and the optics are sufficiently close together, the orientations of the peripheral devices with respect to the steerable antenna and with respect to the optics are substantially the same. From the configuration of the imaging optics and the orientation of the peripheral device antennae (108a-112a) with respect to the optics, the portable electronic device can therefore calculate where on the display the peripheral device antennae (108a-112a) would appear if the antennae were visible. This calculated position of peripheral device antennae (108a-112a) enables the first measure of orientation to be cross-correlated with the second measure thereby enabling association of the respective communication channel signalling from respective devices.

Again, a cross-correlation of two independent sources of geographical location signalling, one determined from the visible spectrum (as represented on the display), and the other from the non-visible spectrum (using steerable antenna) allows the association with communication signalling and discrimination of communication signalling from a particular peripheral device.

FIG. 4b illustrates a graphical representation, produced by the embodiment of FIG. 3, of the determined second measure of geographical location of the peripheral devices (108-112) superimposed on the displayed image of the first measure of geographical location of the peripheral devices.

The calculated image position of each peripheral device antenna (108a-112a) is represented by a communication channel signalling indicator. The communication channel signalling indicator (111b) for each peripheral device is depicted as the four vertices of a square within the imaging optics field of view. The centre of a communication channel signalling indicator square represents the relative orientation of each peripheral device's transmitting antenna. The size of a communication channel signalling indicator square represents the confidence interval or error of the second measure of orientation (a larger square implies a less accurate measure of orientation). Associated with each communication channel signalling indicator (111b) is a communication channel signalling indicator letter (111c).

For the configuration of the portable electronic device and objects shown in FIG. 1, the peripheral device antenna transmitting the communication channel signalling of the scanner (108a) is outside the field of view of the imaging optics of the portable electronic device. However the scanner antenna is within the field of view of the steerable antenna (304) of the portable electronic device (301) so the display indicates on the screen that the scanner communication channel signalling transmitter is not displayed and indicates to the user in which direction (arrow e) the portable electronic device should be re-oriented to include the scanner antenna within the displayed image. It will be appreciated that the geographical location signalling receiver (imaging optics (307) in this case) may or may not have the same field of view as the communication channel signalling receiver (steerable antenna (304) in this case). The field of view of a receiver is the range of angles/distances/geographical locations in which the receiver can detect an object.

By entering the letter corresponding to a communication channel transmitter indicator letter (111c) on the keypad (302) the corresponding device (109-112) is selected. In other embodiments, a peripheral device may be selected using, for example, a cursor or touch-screen.

FIG. 4c illustrates the display when the particular peripheral device is selected. The scanning antenna is then configured only to transmit/receive signalling to/from that geographical location. In this way only signalling from the particular peripheral device is received and processed. A status bar (316) informs the user that the portable electronic device (301) is connecting to the particular peripheral device (111). When the connection is complete (which may require authentication), the display may display information relevant to the functionality that the particular peripheral device can provide. In this case functionality may include transferring files (for example, documents, music files, video clips) between the portable electronic device (301) and the computer (111).

The steerable antenna can discriminate between the different peripheral devices by receiving only communication channel signalling which has phase differences (or time of arrival differences) between constituent antennae which correspond to the different geographical positions (relative orientations) of the particular peripheral device with respect to the portable electronic device.

Figure 5A:
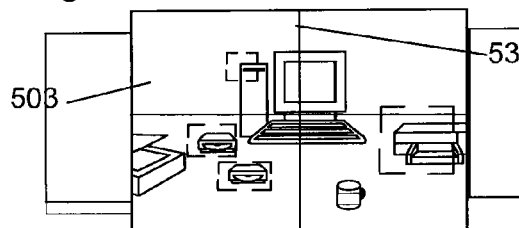
FIGS. 5a and 5b show the display of a second embodiment with an alternative selecting method.
Figure 5B:
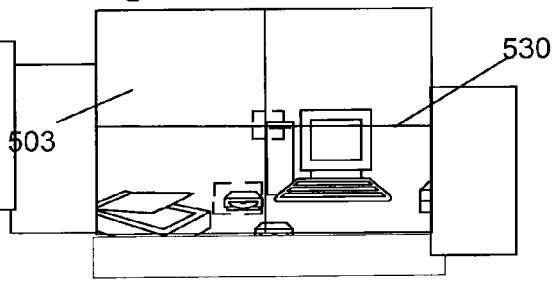

Different user interfaces/apparatus may be used to select the particular peripheral device. For example, FIG. 5a depicts the screen of a further embodiment which is similar to the embodiment of FIG. 3 but has only a single button interface. The display has crosshairs (530) indicating a point on the screen. To select the particular peripheral device the user orientates the portable electronic device to align the communication channel signalling indicator corresponding to the particular peripheral device with the crossing point of the crosshairs (530) and presses the single button to select the particular peripheral device. In this case the portable electronic device discriminates communication channel signalling coming from a preferred relative orientation (corresponding to the orientation represented by the centre of the crosshairs). By orientating the portable electronic device such that the communication channel signalling indicator is overlapped with the crosshairs, the portable electronic device discriminates the corresponding communication channel signalling of the particular peripheral device.

In this case the antenna (e.g. a directional antenna) of the electronic device has a distinct field of view for different functions. That is, the apparatus antenna is configured to detect signalling from a range of orientations, but is configured to transmit/receive (or initiate connection with) signalling only from the relative orientation indicated on the screen by the centre of the crosshair. On selection, the electronic device may initiate connection with the particular peripheral device which is within the transmitting/receiving field of view of the electronic device's antenna. Discrimination in this case is performed by the restricted field of view of the antenna, rather than a cross-correlation of two independent sources of geographical location measures.

Figure 6A:
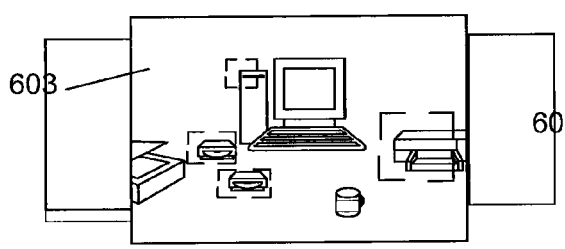
FIGS. 6a and 6b illustrate the display of a third embodiment with an alternative selecting method.
Figure 6B:
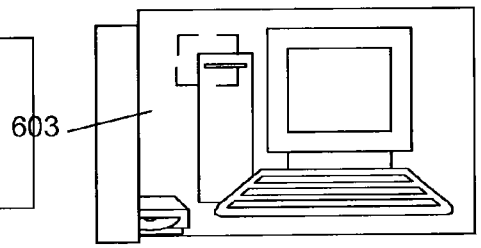

FIG. 6a depicts the screen of a further embodiment which is similar to the embodiment of FIG. 5a but wherein the optics are further configured to enable zooming and wherein the display does not have crosshairs indicating a particular region of the screen. Zooming enables an image to be magnified or enlarged. In different embodiments this may be implemented by having configurable imaging optics (optical zoom) and/or by processing the image data (digital zoom). In this embodiment in order to select the particular peripheral device the user orientates/points the portable electronic device and uses the imaging optics' zoom such that only the particular peripheral device's communication channel signalling indicator is shown on the display (FIG. 4a). In this case, the antenna's field of view automatically adjusts so as to detect and/or discriminate communication channel signalling coming only from within the orientations indicated on the display. When the select button is pressed, the apparatus detects how many communication channel signallings are present. If the user has zoomed in on a single particular peripheral device (thereby also restricting the field of view of the antenna) the apparatus will only detect a single communication channel signalling and initiate connection to the particular peripheral device. Again the first measure of geographical location is actively dictated by the user orientating the portable electronic device and zooming.

Other embodiments may also support the use of more complex measures of geographical location. For example, an embodiment may distinguish peripheral devices based on measures of both distance and relative orientation (rather than measures of one of distance and relative orientation, as in previously described embodiments). It will be appreciated that distinguishing different peripheral devices on the basis of geographical location may enable the selection and/or discrimination of a particular peripheral device.

A further embodiment (not illustrated in the figures) is configured to distinguish peripheral devices based on measures of both distance (from the electronic device) and relative orientation (with respect to the portable electronic device (e.g. centrally positioned or to one side as viewed on the display)). It can be considered as an adaptation of the embodiment of FIG. 3 as it cross-correlates two independent sources of geographical location measures, wherein the each of the geographical location measures comprises a measure of relative orientation. However, in this embodiment the cross-correlation is also based on both different sources for measures of distance between the apparatus, and the different sources for measures of relative orientation. This will be explained below.

In this embodiment a first measure of distance is determined from the geographical location signalling (which in this case is scattered visible light) and a second measure of distance is determined from the communication channel signalling (which in this case is radio waves).

In order for this embodiment to determine a first measure of distance for the first measure of geographical location, the imaging optics of this embodiment are configured to enable contrast detection autofocus of the visible light scattered by the surface of the peripheral device. In order for this embodiment to determine a second measure of distance for the second measure of geographical location, the steerable antenna is further configured to measure the strength of the received signal transmitted by the peripheral device antenna.

The user interface provided for this embodiment is the same as that provided for the embodiment shown in FIG. 3. Therefore the selection display will be the same/similar as is shown in FIG. 4b when the portable electronic device has imaged the scene (the scene as shown in FIG. 1), detected the orientation of the peripheral device antennae and superimposed the communication channel signalling indicators on the displayed image. The process of selection of the particular peripheral device by the user is also the same as is described for the embodiment of FIG. 3.

When the user has selected the particular peripheral device based on orientation using the display interface, this further embodiment uses the configurable optics to autofocus on the selected area of the screen (the area corresponding to the communications channel signalling indicator) in order to get a first measure of distance (using the scattered visible light). Additionally, the apparatus calculates a second measure of distance using measurements of the received communication signalling strength from the relative orientation corresponding to the selected area of the screen (and using, for example, knowledge of the expected signal strength at a given distance). These two measures of distance are compared with each other to ensure that the particular peripheral device is unambiguously selected.

In this way the first measure of relative orientation is cross-correlated with the second measure of relative orientation and the first measure of distance is cross-correlated with the second measure of distance. Using these cross-correlations, the first measure of geographical location (distance/orientation) is associated with the communication channel signalling of the particular peripheral device. By cross-correlating two sets of measures of geographical location (the two distance measures being one set and the two relative orientation measures being another set) a more robust association of the first measure of geographical location (comprising the first measure of distance and the first measure of orientation) with the communication channel signalling may be implemented.

As in some previously described embodiments, the apparatus of this further embodiment cross-correlates two measures of geographical location, one measure determined from the geographical location signalling (visible light), and the other measure determined from communication channel signalling (radio waves). In this case, each measure of geographical location comprises both a measure of the distance between the peripheral device and the apparatus, and a measure of the orientation of the peripheral device relative to the apparatus.

Although this embodiment uses both the relative orientation of the particular peripheral device with respect to the portable electronic device, and the distance between the particular peripheral device and the portable electronic device to cross-correlate the two independent sources of geographical location measures, the user-interface is such that the user may use only the measures of orientation to select which peripheral device he/she wants to connect to (as the display clearly shows information relating to relative orientation).

Other embodiments may also display information concerning the distance component of the geographical location. By also displaying information concerning the distance component of the geographical location the user may select between peripheral devices which have the same/similar relative orientations but have different distances.

Figure 7A:
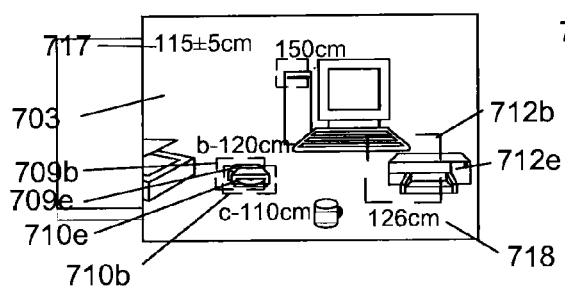
FIGS. 7a and 7b depict the display of a forth embodiment which incorporates distance measurements of the peripheral devices.

FIG. 7a illustrates a display of such an embodiment. The signalling receivers (optics for visible light (geographical location signalling) and steerable antenna for radio waves (communication channel signalling)) are similar as those of the previously described embodiment. However, unlike the optics of the previous embodiment which enable autofocussing, the optics of the embodiment of FIG. 7a enable manual focussing. In FIG. 7a a scene (comprising a number of objects) is displayed on the screen where the desired particular peripheral device is the first disc drive. The first disc drive is represented on the display by its image (709e). The first disc drive image (709e) is partially concealed behind the second disc drive image (710e). Similarly, the first disc drive communication channel indictor (709b) overlaps with the second disc drive communication channel indictor (710b). Therefore, in this case, cross-correlating the first measure and second measure of relative orientation does not allow the communication channel signalling to be unambiguously associated with the first measure of geographical location. However the difference in distance between the two disc drives would be enough to distinguish the desired first disc drive from the redundant second disc drive, and to allow a first measure of geographical location (comprising a first measure of distance and a first measure of relative orientation) to be associated with the corresponding communication channel signalling.

From the received signal strength of the communication channel signalling, as measured by the steerable antenna, a second measure of distance is calculated for each of the peripheral devices. The second measure of distance is shown on screen as a value (718) alongside the corresponding communication channel signalling indicator.

Additionally as shown in FIG. 7a, the portable electronic device is configured to focus objects within a range of distances from the apparatus. Objects within this focus range will appear sharply on the display. By manually changing the configuration of the optics, the focus range can be changed. The focus range is shown as a focus range value (717) on the display. The focus range value (the first measure of distance) is determined by calculating, from the configuration of the optics, the distance an object must be away from the optics to be sharply imaged at the CCD. In this way the user is provided with the first measure of distance because if an object is in focus (i.e. it appears sharply on the screen) the distance between the object and the portable electronic device is within the focus range value as displayed on the screen.

The user may select peripheral devices within a distance range by manually focussing on the desired peripheral device. When the desired peripheral device appears sharply on the screen, the user will know that the object is within the focus range as given by the focus range value. The focus range value gives a first measure of distance to the focused object (using scattered visible light).

By cross-correlating the focus range value with the second measure of distance (determined from the communication channel signalling) this embodiment only provides transmitting peripheral device antennae which have an associated second measure of distance within the focus range value with a communication channel signalling indicator letter. For example, in FIG. 7a, only the two disc drives have a second measure of distance (110 cm and 120 cm) within the focus range value (115±5 cm). Therefore only the two disc drives have a corresponding communication channel signalling indicator letter. In this case both disc drives will appear sharply on the screen (as they are both in focus).

Figure 7B:
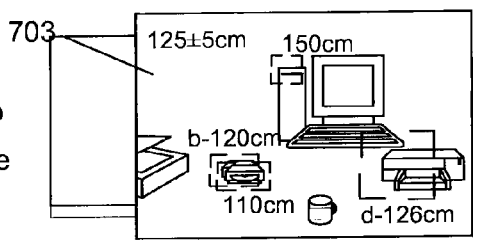

By refocusing the optics to a slightly longer focus range (125±5 cm), as shown in FIG. 7b, the user has prompted the removal of the communication channel signalling indicator letter corresponding to the second disc drive. This is because the second measure of distance (110 cm) to the second disc drive indicates that it is too close to the apparatus to be in focus. Therefore the second disc drive will not appear sharply on the screen.

In this way by using the keyboard/display interface to select the particular peripheral device, this embodiment enables only peripheral devices within the focus range to be selected. This allows peripheral devices which have the same or similar orientations, or angles, with respect to the apparatus to be distinguished.

Discrimination in this case may be implemented on the basis of characteristic communication channel signalling or by processing only communication channel signalling within a certain signalling strength (thereby using distance to discriminate between communication channel signallings). It will be appreciated that discrimination can also be on the basis of orientation.

Once the first disc drive is selected and discriminated, the portable electronic device will connect to the first disc drive and enable the functionality of that peripheral device to be utilised, for example, to read a film stored on a DVD in the second disc drive in order to watch it on the portable electronic device screen.

Figure 8:
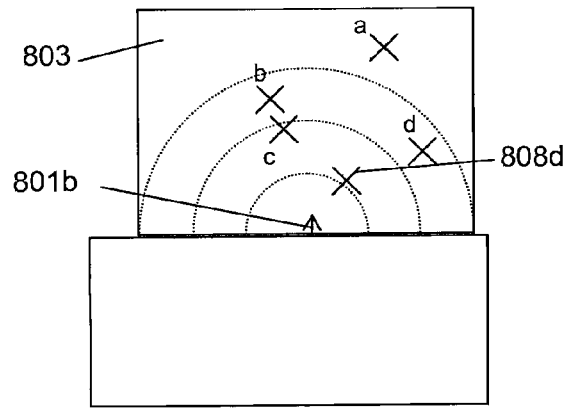
FIG. 8 shows an alternative graphical display of a fifth embodiment, which is in the form of a map.

Other embodiments may give a graphical interpretation of the information rather than displaying captured data from the scene. FIG. 8 shows the display of such an embodiment, resulting from the scene of FIG. 3. This information may be transmitted to the portable electronic device by a device in its vicinity or generated by the portable electronic device using first/second measures of geographical location. In this case the geographical location is represented on screen as a bird's eye view map of the scene. In this case the geographical location information is obtained and associated with the communication channel signalling via similar methods as described previously. The distinction is in the way that information is displayed to the user.

In this embodiment the portable electronic device is represented as an arrow (801b). Each object is depicted as a cross (808d) which is a geographical location signalling indicator. The geographical location signalling indicator gives a representation of the position of each object as determined using geographical location signalling. Each transmitting peripheral device is also given a communication channel transmitter indicator letter based on cross-correlation of a second measure of the geographical position using the communication channel signalling with the first measure of geographical location. In this way the communications channel signalling is associated with the first measure of geographical location. The association of the communication channel with the first measure of the geographical location prevents a communication channel transmitter indicator letter being assigned to the cup (108) as although it has been detected by the geographical location signalling, there is no corresponding communication channel signalling coming from that geographical location.

By using keys corresponding to the communication channel transmitter indicator letter a particular peripheral device can be selected and discriminated.

Figure 9:
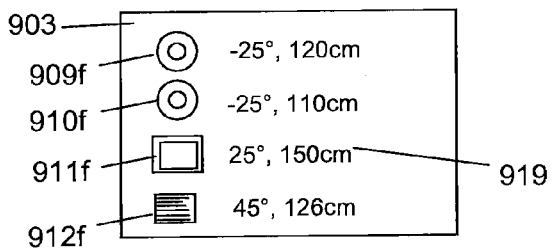
FIG. 9 shows an alternative graphical display of a sixth embodiment, which is in the form of a list.

A further embodiment, the display of which is depicted in FIG. 9, determines a first measure geographical location of the objects in a scene using geographical location signalling (for example using contrast detection autofocus of visible light) and determines a second measure of geographical location of objects in a scene using communication channel signalling (for example using signal strength of radio waves). Those peripheral devices which have corresponding first and second measures of geographical location are recognised by the electronic device comprising the apparatus as available peripheral devices. The apparatus associates the first measure of geographical location with the corresponding communication channel signalling for each available peripheral device.

Rather than providing a graphical representation or interpretation, the first measure of geographical location of each available peripheral device is displayed as a list. This embodiment may be particularly useful for portable electronic devices with limited screen resolution, or which would not support a graphical representation of the information.

The user, having independent knowledge of the geographical location of the particular peripheral device desired, can use that knowledge to select the desired device. In addition, this embodiment can distinguish, from characteristic communication channel signalling, the nature of each peripheral device (e.g. the communication signalling from a particular peripheral device allows determination of its function). This is represented on the list by giving an appropriate peripheral device symbol corresponding to each geographical location. The peripheral device symbols (909f-912f) in this case denote each device either as a printer (912f), as a disc drive (909f, 910f) or as a computer (910f). These symbols (909f-912f) allow two peripheral devices which are in close proximity but with distinct functions to be distinguished by the user. If, for example, a printer was located close to a disc drive, the user could select which device to connect to on the basis of its function as well as its geographical location.

When the particular peripheral device has been selected the electronic device particular may initiate connection with the particular peripheral device.

It will be appreciated that, although some selection modes have been described with respect to a particular embodiment, a single embodiment may enable the user to use a combination of one or more of these modes.

It will be appreciated that the selection of a particular peripheral device can be performed using a real-time video stream of the scene, a recorded video of the scene or a captured image of the scene. For pre-captured or pre-recorded geographical location signalling data, the apparatus may also require corresponding communication channel signalling information to enable association of the communication channel signalling with the first measure of geographical location. This may require the device comprising the apparatus to record or calculate a data set comprising information relating to both the determined first measure of the geographical location and the communication channel signalling.

All of the embodiments described thus far have some form of display for displaying information. However the embodiment of FIGS. 10a and 10b does not have a display, but instead uses a pointer to distinguish to the user which peripheral device is being selected as the particular peripheral device.

Figure 10A:
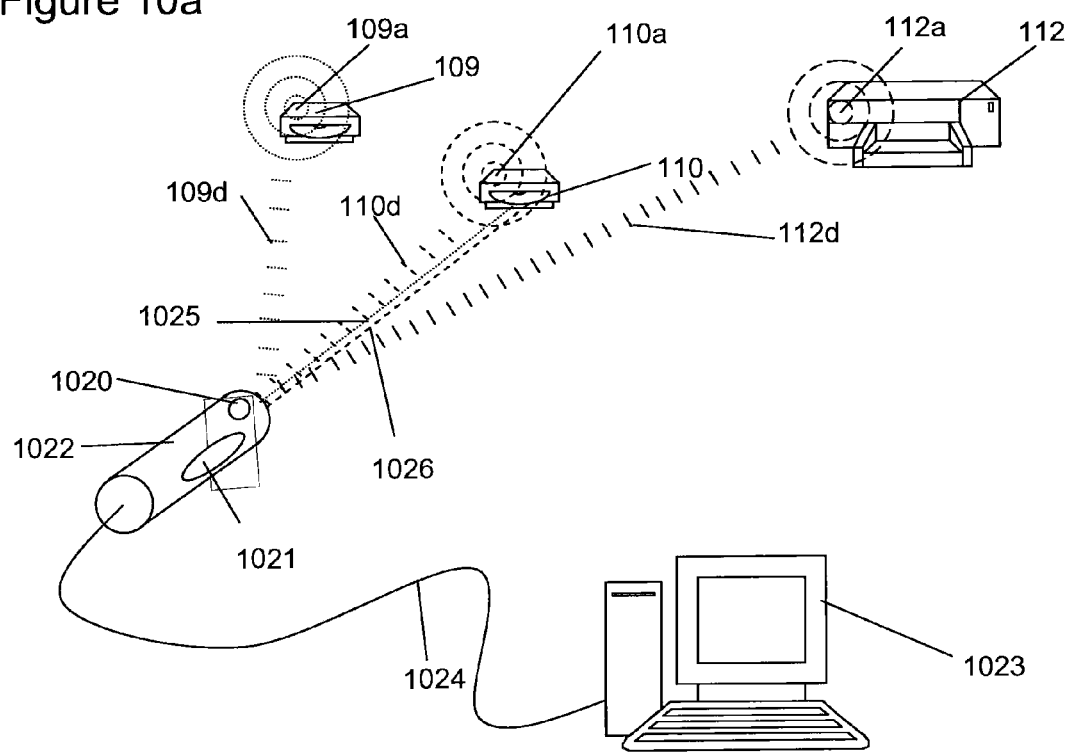
FIG. 10a illustrates a seventh embodiment, comprising a pointer connected to an electronic device, interacting with a scene comprising a number of peripheral devices.
Figure 10B:
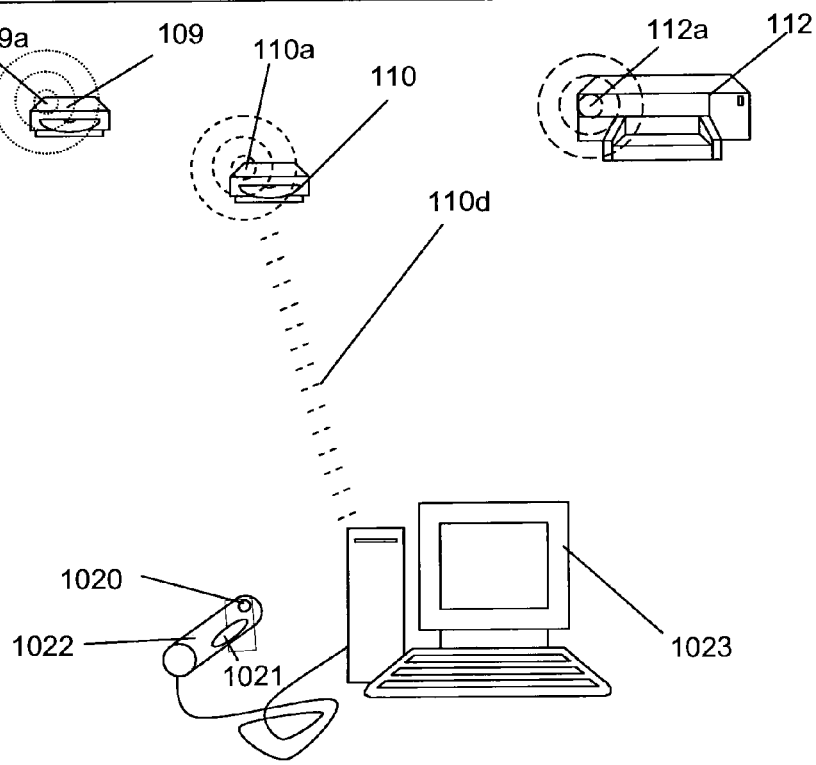
FIG. 10b depicts the embodiment of FIG. 10a, wherein the communication channel signalling has been selected and discriminated and wherein the computer is connected to the particular peripheral device.

FIG. 10a illustrates the embodiment comprising a pointer (1022). The pointer (1022) is connected to a computer (1023) (which is an electronic device) by a cable (1024) which is configured to enable data transfer between the pointer (1022) and the computer (1023). The apparatus may be a processor contained within the pointer (1022), within the computer (1023) or within the computer (1023) and the pointer (1022).

In the locality are a number of peripheral devices including the first disc drive (109), the second disc drive (110) and the printer (112) each peripheral device having an antenna (109a, 110a and 112a). Each peripheral device emits characteristic communication channel signalling (109d, 110d and 112d), as each peripheral device transmits at a distinct frequency.

The pointer (1022) comprises an LED (light emitting diode) (1020), a select button (1021), an antenna for determining the strength of a radio signal (109d, 110d, 112d), a laser pointer for emitting a directional beam of light (1026) and an infrared emitter/detector for emitting and detecting a directed infrared pulse (1025) along or approximately along the beam of light (1026). In this case the geographical location signalling is infrared radiation (1025) and the particular communication channel signalling (110d) is radio waves. The antenna has a large field of view and can detect communication channel signalling (109d, 110d, 112d) transmitted by the three peripheral devices (109, 110, 112) in the locality.

The user desires to connect the computer (1023) to the second disc drive (110). To select the second disc drive (110) the user points the pointer such that the laser beam strikes the desired particular peripheral device, which in this case is the second disc drive (110). Laser light scattered by the particular peripheral device can be seen by the user. A first measure of the distance between the particular peripheral device (110) and the pointer (1022) is determined by sending a pulse of infrared radiation (1025) along or approximately along the same path as the laser beam of light (1026) and measuring the time taken for the pulse (1025) to traverse the distance to the object (110), be scattered or reflected, and return to the pointer. Using knowledge of the speed of light and the time taken, the first measure of the distance between the object (110) and the pointer (822) can be calculated (or determined).

If there is an emitting peripheral device (109, 110 and 112) within the antenna's field of view, as is the case depicted in FIG. 8a, the antenna can measure the strength of the radio signal (109d, 110d and 112d) to determine a second measure of the distance between the peripheral device (109d, 110d and 112d) and the apparatus of the pointer. The first measures and the second measures are then compared (cross-correlated) by the apparatus. When a first measure matches a second measure within an acceptable margin of error the LED (1020) is illuminated. In this case the first measure of the distance of the second disc drive matches the second measure of the distance of the second disc drive so the LED (1020) is illuminated. In effect, the apparatus cross-correlates the first measure of distance (using infrared) with the second measure of distance (using radio-waves) to enable the first measure of distance to be associated with the communication channel signalling.

When the LED is illuminated the button (1021) can be pressed to indicate selection of the peripheral device with matching first and second measures of distance. The pointer antenna discriminates and records the distinctive frequency range of the characteristic communication channel signalling (110d) corresponding to the peripheral device (110) with the matched first and second measures of geographical location, and transfers this characteristic frequency range to the computer (1023).

This enables the computer to scan for communication channel signalling within the distinctive frequency range to enable connection between the computer (1023), which may be a laptop or a desktop computer, and the second disc drive (110). FIG. 8b shows the pointer comprising the apparatus, the electronic device (1023) and the scene when the connection is established between the electronic device (1023) and the particular peripheral device (110). The pointer (1022) need not then be pointed at the particular peripheral device (110) as the computer has all the required information to maintain a connection with the particular peripheral device. When connected the computer can utilise the functionality of the second disc drive (110), for example, to burn data contained on the computer onto a CD.

It will be appreciated that the connection between the pointer (1020) and the electronic device (1023) may be wired or wireless. It will be appreciated that, in other embodiments, the electronic device may comprise a pointer.

It will be appreciated that by discriminating on the basis of characteristic communication signalling, a peripheral electronic device may maintain connection with an electronic device even if there is relative motion between the particular peripheral device and the electronic device.

In the case where discrimination is based on geographical location, connection may be maintained by repeatedly determining the relative geographical location of the peripheral devices and providing connection with the particular peripheral device which is closest to the relative geographical location determined at the previous step.

Figure 11:
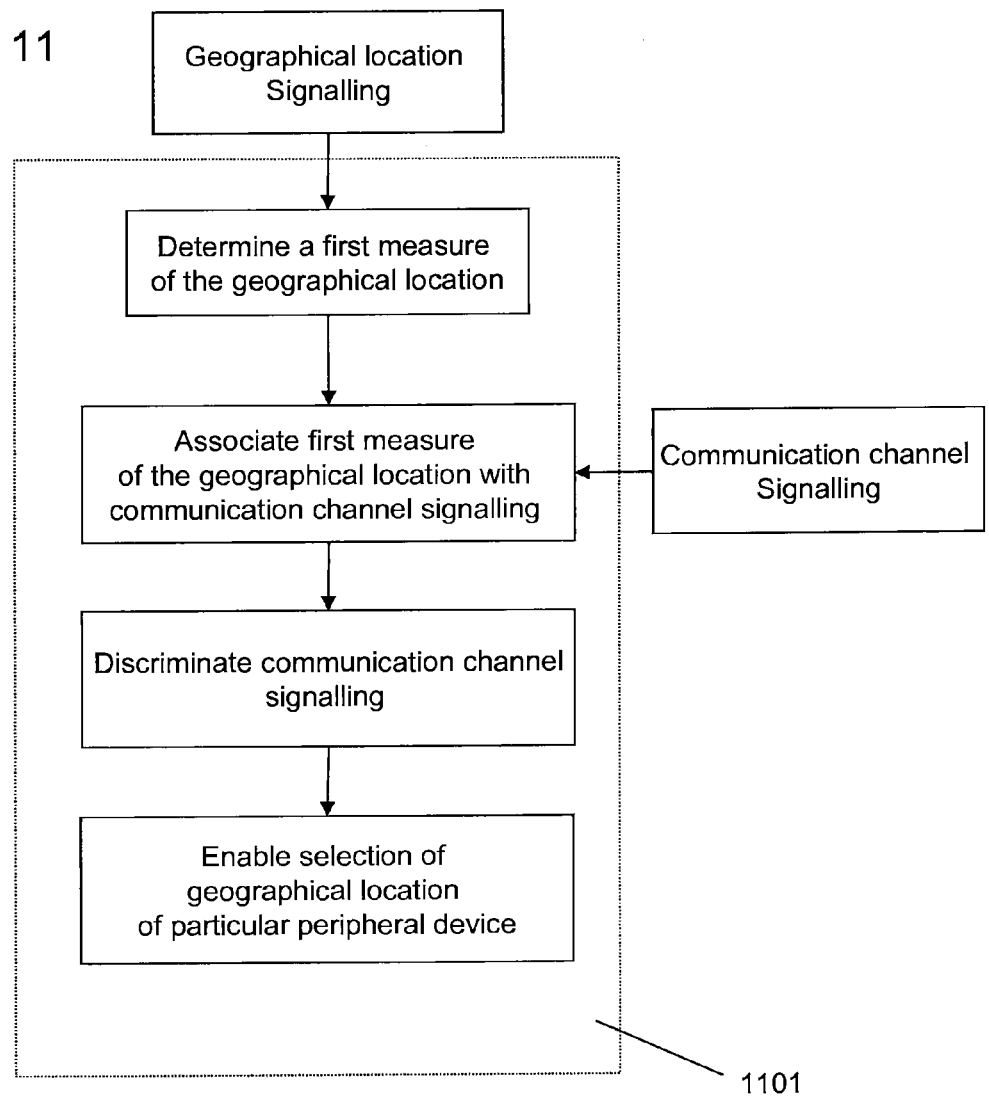
FIG. 11 gives a flow chart of the method of operating an embodiment.

FIG. 11 depicts a flow chart of the method used by an embodiment of the apparatus (1101) to interact with the geographical location signalling and the communication channel signalling.

Figure 12:
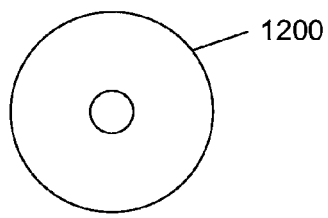
FIG. 12 illustrates schematically a computer readable media providing a program according to an embodiment of the present invention.

FIG. 12 illustrates schematically a computer/processor readable media (1200) providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that a computer program may be stored on a storage medium. It will be appreciated that peripheral devices may emit communication channel signalling autonomously of the apparatus. Alternatively, peripheral devices may emit communication channel signalling in response to a request signal from the apparatus It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another. Signalling may encompass any energy transmitting disturbance, including electromagnetic radiation (electromagnetic radiation encompasses ultraviolet light, visible light, infrared and radio waves), sound waves and ultrasound (with any frequency in the sound spectrum).

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
at least one processor, at least one memory including computer program code, the at least one memory and the computer program code configured to, with the at least one processor, cause the apparatus to at least:
make a first measurement between the apparatus and a peripheral device, wherein said first measurement comprises one of a physical distance measurement or a relative position measurement, the relative position measurement performed using one of radio wave detection and imaging methods;
determine a location correlation by correlating the first measurement with a second measure of a location of the peripheral device made using communication channel signaling from the peripheral device; and
select the peripheral device for use based at least in part on the location correlation.

2. The apparatus of claim 1, wherein the second measure comprises a second distance value corresponding to the distance between the peripheral device and the apparatus as determined using communication channel signaling.

3. The apparatus according to claim 1 wherein the at least one memory and the computer program code are configured to, with the at least one processor, cause the apparatus to:
determine a first distance measurement to a particular peripheral device using one or more of active autofocus or passive autofocus.

4. The apparatus according to claim 1 wherein the at least one memory and the computer program code are configured to, with the at least one processor, cause the apparatus to:
make a first physical distance measurement by selecting a peripheral device and zooming onto an image of the peripheral device.

5. The apparatus according to claim 1, wherein the at least one memory and the computer program code are configured to, with the at least one processor, cause the apparatus to:
correlate the first measurement with the communication channel signaling using a comparison between the first measurement and the second measure corresponding to the communication channel signaling.

6. The apparatus of claim 1, wherein the second measure comprises an orientation value corresponding to an orientation of the peripheral device relative to the apparatus as determined using the communication channel signaling.

7. The apparatus of claim 1 wherein the at least one memory and the computer program code are configured to, with the at least one processor, cause the apparatus to:
determine the second measure of the location of a peripheral device using one or more of a received signal strength or time of flight as determined using the communication channel signaling.

8. The apparatus of claim 1, wherein the at least one memory and the computer program code are configured to, with the at least one processor, cause the apparatus to:
determine the second measure of the location of a peripheral device by calculation of an angle of incidence from measurements of the phase of the communication channel signaling.

9. The apparatus according to claim 1, wherein the apparatus further comprises a pointer configured to enable selection of the peripheral device by orienting the pointer to point at the peripheral device to allow the apparatus to use the peripheral device.

10. A computer program product comprising at least one non-transitory computer-readable medium storing program code instructions therein, the program code configured to perform a method comprising:
making a first measurement between a mobile device and a peripheral device, wherein said first measurement comprises one of a physical distance measurement or a relative position measurement, the relative position measurement performed using one of radio wave detection and imaging methods;
determining a location correlation by correlating the first measurement with a second measure of a location of the peripheral device made using communication channel signaling from the peripheral device; and
selecting the peripheral device for use based at least in part on the location correlation.

11. A method comprising:
making a first measurement between a mobile device and a peripheral device, wherein said first measurement comprises one of a physical distance measurement or a relative position measurement, the relative position measurement performed using one of radio wave detection and imaging methods;
determining a location correlation by correlating the first measurement with a second measure of a location of the peripheral device made using communication channel signaling from the peripheral device; and selecting the peripheral device for use based at least in part on the location correlation.

12. The method of claim 11 wherein the second measure comprises a second distance value corresponding to the distance between the peripheral device and the mobile device as determined using communication channel signaling.

13. The method of claim 11, further comprising:
determining the first measurement to a peripheral device using one or more of active autofocus or passive autofocus.

14. The method of claim 11, further comprising:
making a first physical distance measurement by selecting a peripheral device and zooming onto an image of the peripheral device.

15. The method of claim 11, further comprising:
correlating the first measurement with the communication channel signaling using a comparison between the first measurement and the determined second measure corresponding to the communication channel signaling.

16. The method of claim 11 wherein the second measure comprises an orientation value corresponding to an orientation of the peripheral device relative to the apparatus as determined using the communication channel signaling.

17. The method of claim 11, further comprising:
determining the second measure of the location of a peripheral device using one or more of a received signal strength or time of flight as determined using the communication channel signaling.

18. The method of claim 11, further comprising:
determining the second measure of the location of a peripheral device by calculation of an angle of incidence from measurements of a phase of the communication channel signaling.

19. The method of claim 11, further comprising:
enabling selection of the peripheral device by orienting a pointer on the mobile device to point at the particular peripheral device to allow the mobile device to use the peripheral device.

20. The apparatus of claim 1 wherein the apparatus is a mobile wireless device.

* * * * *